United States Patent
Miyamoto et al.

(10) Patent No.: US 10,221,287 B2
(45) Date of Patent: Mar. 5, 2019

(54) RESIN COMPOSITION AND RESIN MOLDED ARTICLE

(71) Applicant: FUJI XEROX CO., LTD., Tokyo (JP)

(72) Inventors: Tsuyoshi Miyamoto, Kanagawa (JP); Daisuke Nakayama, Kanagawa (JP); Masayuki Okoshi, Kanagawa (JP); Hiroyuki Moriya, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 15/662,942

(22) Filed: Jul. 28, 2017

(65) Prior Publication Data

US 2018/0179346 A1    Jun. 28, 2018

(30) Foreign Application Priority Data

Dec. 26, 2016    (JP) .................. 2016-250520

(51) Int. Cl.
| | |
|---|---|
| C08L 23/12 | (2006.01) |
| C08L 23/26 | (2006.01) |
| C08K 7/06 | (2006.01) |
| C08L 77/02 | (2006.01) |
| C08J 5/04 | (2006.01) |

(52) U.S. Cl.
CPC .............. *C08J 5/042* (2013.01); *C08K 7/06* (2013.01); *C08L 23/12* (2013.01); *C08L 23/26* (2013.01); *C08L 77/02* (2013.01); *C08L 2205/08* (2013.01); *C08L 2666/55* (2013.01); *C08L 2666/72* (2013.01)

(58) Field of Classification Search
CPC ......... C08J 5/0142; C08L 23/12; C08L 23/26; C08L 77/02; C08L 2666/55; C08L 2666/72; C08L 2205/08; C08K 7/06
USPC ......................................................... 524/514
See application file for complete search history.

(56) References Cited

U.S. PATENT DOCUMENTS

| | | | |
|---|---|---|---|
| 6,794,032 B2 | 9/2004 | Borgner et al. | |
| 2015/0285438 A1* | 10/2015 | Bzducha | C08J 5/18 206/6 |

FOREIGN PATENT DOCUMENTS

| | | |
|---|---|---|
| JP | 2000-71245 A | 3/2000 |
| JP | 2003-528956 A | 9/2003 |
| JP | 2014-181307 A | 9/2014 |

* cited by examiner

Primary Examiner — William K Cheung
(74) Attorney, Agent, or Firm — Sughrue Mion, PLLC

(57) ABSTRACT

A resin composition includes a thermoplastic resin, a carbon fiber, a resin containing at least one of an amide bond and an imide bond and having such a melting temperature that a difference in melting temperature between the resin containing at least one of an amide bond and an imide bond and the thermoplastic resin is 90° C. or lower, and a compatibilizer.

10 Claims, 2 Drawing Sheets

RESIN COMPOSITION AND RESIN MOLDED ARTICLE

CROSS-REFERENCE TO RELATED APPLICATIONS

This application is based on and claims priority under 35 USC 119 from Japanese Patent Application No. 2016-250520 filed Dec. 26, 2016.

BACKGROUND

1. Technical Field

The present invention relates to a resin composition and a resin molded article.

2. Related Art

In the related art, various resin compositions are provided and are used for various applications.

In particular, resin compositions containing a thermoplastic resin are used in various components and housings of home electronics and automobiles or are used in various components such as housings of business machines and electric and electronic apparatuses.

SUMMARY

According to an aspect of the invention, there is provided a resin composition including:
 a thermoplastic resin;
 a carbon fiber;
 a resin containing at least one of an amide bond and an imide bond and having such a melting temperature that a difference in melting temperature between the resin containing at least one of an amide bond and an imide bond and the thermoplastic resin is 90° C. or lower; and
 a compatibilizer.

BRIEF DESCRIPTION OF THE DRAWINGS

Exemplary embodiments of the present invention will be described in detail based on the following figures, wherein.

DETAILED DESCRIPTION

Figure 1:
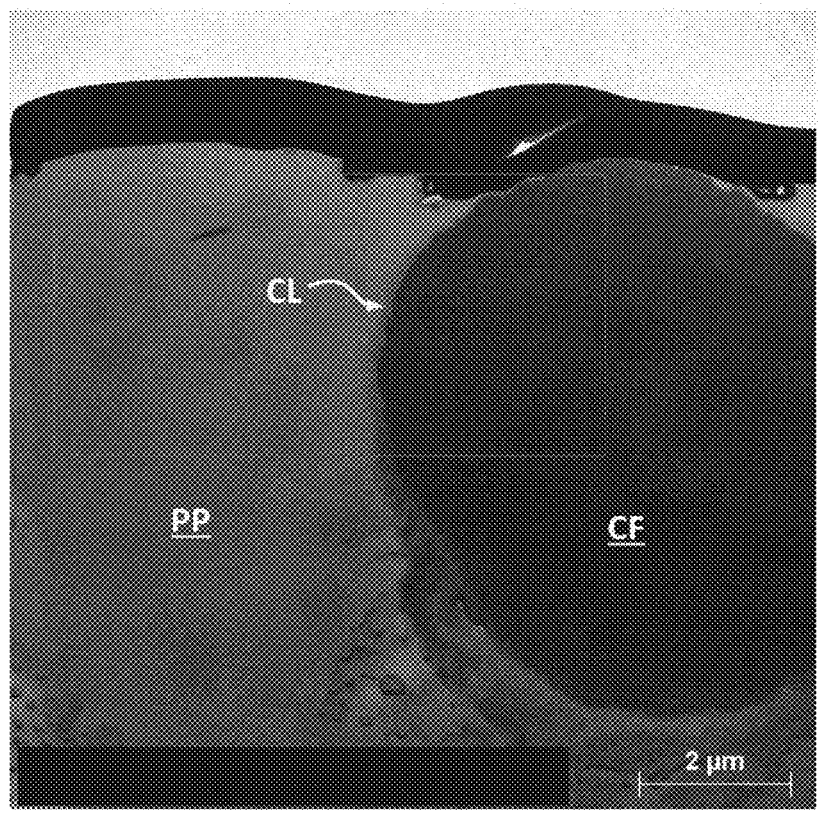
FIG. 1 is a model diagram showing major parts of a resin molded article according to an exemplary embodiment.

Hereinafter, an exemplary embodiment which is an example of a resin composition and a resin molded article according to an exemplary embodiment of the invention will be described.

Resin Composition

The resin composition according to the exemplary embodiment includes a thermoplastic resin, a carbon fiber, a resin containing at least one of an amide bond and an imide bond, and a compatibilizer.

Hereinafter, the resin containing at least one of the amide bond and the imide bond will be referred to as "specific resin".

In recent years, in order to obtain a resin molded article having high mechanical strength, a resin composition containing a thermoplastic resin as a matrix and a reinforcing fiber has been used.

In the resin composition, when affinity between the reinforcing fiber and the thermoplastic resin is low, a space is formed at an interface therebetween, and adhesion at the interface may deteriorate.

In particular, in a case where a carbon fiber is used as the reinforcing fiber in the resin composition, higher mechanical strength, particularly bending elastic modulus, than that of glass fiber is required. However, since the polar group contributing to adhesion to the thermoplastic resin such as hydroxyl group and carboxy group on the surface of the carbon fiber is smaller than the polar group of the glass fiber, the adhesion at the interface between the carbon fiber and the thermoplastic resin deteriorates. As a result, the mechanical strength, particularly the bending elastic modulus is hardly increased while carbon fibers are incorporated. In particular, in a case where repeated impact is applied, flaking easily proceeds at the interface between the carbon fiber and the thermoplastic resin, so that the mechanical strength, particularly the bending elastic modulus, tends to be largely deteriorated.

Therefore, the resin composition according to the exemplary embodiment contains four components of the thermoplastic resin, the carbon fiber, the specific resin, and the compatibilizer.

With this configuration, the resin molded article having superior mechanical strength, particularly the bending elastic modulus may be obtained.

Here, when the resin molded article is formed using the resin composition containing four components of the thermoplastic resin, the carbon fiber, the specific resin, and the compatibilizer, the resin composition is thermally melted. For example, in a case where a resin having a melting temperature higher than the melting temperature of the thermoplastic resin in the resin composition and a large difference in the melting temperature with the thermoplastic resin is applied as the specific resin, in order to thermally melt the specific resin, the specific resin may be melted at the temperature at which the temperature is excessively higher than the temperature at which the thermoplastic resin may melt. In addition, when the resin composition is melted at the excessively higher temperature than the temperature at which the thermoplastic resin may melt, for example, thermal degradation of the thermoplastic resin in the resin composition may cause decomposition of the thermoplastic resin. As described above, when the resin composition contains the four components of the thermoplastic resin, the carbon fiber, the specific resin, and the compatibilizer, a resin molded article having particularly superior bending elastic modulus may be obtained, but when the thermoplastic resin in the resin composition is decomposed, the obtained resin molded article is likely to be deteriorated in the bending elastic modulus.

On the other hand, for example, in consideration of the prevention of thermal deterioration of the thermoplastic resin, productivity, and the like, when the heating temperature is kept low and the resin composition is to be melted at a temperature at which the thermoplastic resin may be melted, since the specific resin has a large difference in the melting temperature with the thermoplastic resin, the specific resin solidifies first during forming the resin molded article, and the thermoplastic resin solidifies with a delay. Therefore, flaking occurs at the interface between the specific resin and the thermoplastic resin, and as a result, defects such as unevenness, ruggedness, and whitening are likely to occur on the surface of the resin molded article.

On the other hand, in addition to containing the above-described four components in the resin composition according to the exemplary embodiment, the difference between the melting temperature of the specific resin and the melting temperature of the thermoplastic resin is set to 90° C. or lower.

By adopting this constitution, in a case where injection molding is performed at a low temperature (for example, cylinder temperature of 240° C.), a resin molded article having superior surface uniformity may be obtained (hereinafter, such properties are referred to as "low temperature moldability" in some cases). Although the operation of obtaining such an effect is not clear, it is presumed as follows.

Since the difference in the melting temperatures between the specific resin and the thermoplastic resin is 90° C. or lower, the resin composition according to the exemplary embodiment is in a state of being thermally melted without heating at an excessively high temperature with respect to the melting temperature of the thermoplastic resin. Therefore, it is presumed that the delay of the solidification of the thermoplastic resin with respect to the solidification of the specific resin is reduced during forming the resin molded article, and defects such as unevenness, ruggedness, and whitening are less likely to occur on the surface of the resin molded article as described above.

From the above, it is estimated that the resin composition according to the exemplary embodiment has superior low temperature moldability because the difference between the melting temperature of the specific resin and the melting temperature of the thermoplastic resin is within the above range.

In addition, in the resin molded article obtained by using the resin composition, deterioration in the bending elastic modulus is also prevented. The reason is not clear, but it is presumed as follows.

It is presumed that decomposition of the thermoplastic resin in the resin composition is prevented by keeping the temperature for melting the thermoplastic resin in the resin composition low. As a result, it is presumed that the deterioration in the bending elastic modulus which is presumed to be caused by the decomposition of the thermoplastic resin in the resin composition is also prevented in the resin molded article.

Furthermore, in the resin composition according to the exemplary embodiment, it is presumed that the temperature during forming the resin molded article is kept low, so that the odor of the resin molded article is likely to be reduced.

Here, as described above, the resin composition according to the exemplary embodiment contains the above-described four components (the thermoplastic resin, the carbon fiber, the specific resin, and the compatibilizer), so that the resin composition particularly has a superior bending elastic modulus. The reason why the above effect is obtained is not clear but is presumed to be as follows.

When the resin composition is thermally molten-kneaded in order to obtain the resin molded article from the resin composition according to the exemplary embodiment, the thermoplastic resin as the matrix and the compatibilizer are melted, and a part of the molecules of the compatibilizer and the amide bond or the imide bond contained in the molecules of the specific resin are compatibilized. As a result, the specific resin is dispersed in the resin composition.

In this state, when the specific resin contacts the carbon fiber, the amide bond or the imide bond contained in a large number along the molecular chain of the specific resin and a polar group slightly present on a surface of the carbon fiber are physically bonded to each other through affinity (attraction and hydrogen bond) at plural sites. In addition, generally, the compatibility between the thermoplastic resin and the specific resin is low. Therefore, due to repulsion between the thermoplastic resin and the specific resin, the contact frequency between the specific resin and the carbon fiber increases. As a result, the amount or area of the specific resin bonded to the carbon fiber increases. In this manner, using the specific resin, the coating layer is formed around the carbon fiber (refer to FIG. 1). In FIG. 1, PP represents the thermoplastic resin, CF represents the carbon fiber, and CL represents the coating layer.

Since the specific resin forming the coating layer is also compatible by performing the chemical reaction with apart of the reactive groups in the molecule of the compatibilizer and electrostatic interaction between the polar groups, the compatibilizer is compatible with the thermoplastic resin. Therefore, an equilibrium state is formed between attraction and repulsion, and the coating layer of the specific resin is formed in a thin and substantially uniform state. In particular, the affinity between a carboxyl group present on a surface of the carbon fiber and the amide bond or the imide bond contained in the molecules of the specific resin is high. Therefore, it is presumed that the coating layer is easily formed around the carbon fiber using the specific resin, and the coating layer is thin and has superior uniformity.

The coating layer preferably coats the entire circumference of the carbon fiber, but there may be a portion which is not partially coated.

As described above, in the resin composition according to the exemplary embodiment, the adhesion at the interface between the carbon fiber and the thermoplastic resin is enhanced. As a result, it is presumed that the resin molded article obtained from the resin composition according to the exemplary embodiment has superior mechanical strength, particularly bending elastic modulus.

Here, it is preferable that the resin composition according to the exemplary embodiment and the resin molded article obtained thereby has a structure in which a coating layer of a specific resin is formed around the carbon fiber by heat molten-kneading and injection molding for preparing of the resin composition (for example, pellet), and the thickness of the coating layer is from 5 nm to 700 nm.

In the resin composition according to the exemplary embodiment, the thickness of the coating layer of the specific resin is from 5 nm to 700 nm, and preferably from 10 nm to 650 nm from the viewpoint of further improving the bending elastic modulus. When the thickness of the coating layer is set to 5 nm or more (especially 10 nm or more), the bending elastic modulus is improved. When the thickness of the coating layer is set to 700 nm or less, the interface between the carbon fiber and the thermoplastic resin via the coating layer is prevented from being weakened, and the deterioration in the bending elastic modulus is prevented.

The thickness of the coating layer is a value measured using the following method. A measurement target is cut in liquid nitrogen, and a cross-section thereof is observed using an electron microscope (VE-9800, manufactured by Keyence Corporation). In the cross-section, the thickness of the coating layer which is formed around the carbon fiber is measured at 100 positions, and the average value thereof is obtained.

The coating layer is determined by observing the above cross-section.

In the resin composition (and the resin molded article thereof) according to the exemplary embodiment, for example, the compatibilizer is configured to be partially compatible with the coating layer and the thermoplastic resin.

Figure 2:
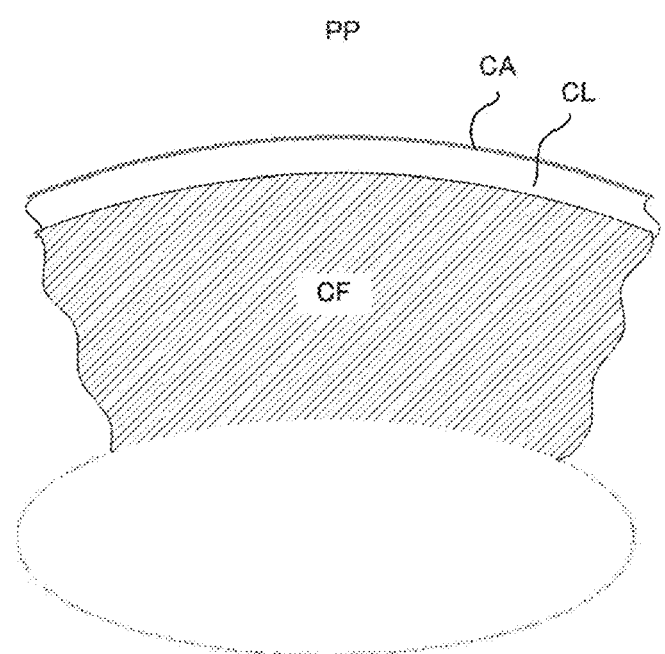
FIG. 2 is a schematic diagram for describing an example of the major parts of the resin molded article according to the exemplary embodiment.

Specifically, for example, a layer of the compatibilizer may be interposed between the coating layer of the specific resin and the thermoplastic resin as the matrix (refer to FIG. 2). That is, the layer of the compatibilizer is formed on the surface of the coating layer, and the coating layer and the thermoplastic resin may be adjacent to each other via the layer of the compatibilizer. Although the layer of the compatibilizer is formed to be thinner than the coating layer, the adhesion (bonding property) between the coating layer and the thermoplastic resin is increased by the interposition of the layer of the compatibilizer, and the resin molded article having superior mechanical strength, particularly bending elastic modulus, is easily obtained. In FIG. 2, PP represents the thermoplastic resin, CF represents the carbon fiber, CL represents the coating layer, and CA represents the layer of the compatibilizer.

In particular, the layer of the compatibilizer is bonded to the coating layer (hydrogen bond, covalent bond by reaction of the functional group between the compatibilizer and the specific resin, and the like), and the thermoplastic resin may be interposed between the coating layer and the thermoplastic resin in a state of being compatible with the thermoplastic resin. This structure is easily achieved, for example, when the compatibilizer has the same structure as or compatible structure with the thermoplastic resin as the matrix, and the compatibilizer containing a site reactive with a functional group of the above-described specific resin is applied to a part of the molecule.

Specifically, for example, in a case where polyolefin is used as the thermoplastic resin, polyamide is used as the specific resin, and maleic anhydride modified polyolefin is used as the compatibilizer, in the layer of the maleic anhydride modified polyolefin (layer of compatibilizer), the carboxy group formed by ring-opening of the maleic anhydride site reacts with and binds to the amine residue of the polyamide layer (coating layer), and the polyolefin site thereof may be interposed in a state of being compatible with the polyolefin.

Here, a method for confirming that the layer of the compatibilizer is interposed between the coating layer and the thermoplastic resin is as follows.

As an analyzer, a microscopic infrared spectroscopic analyzer (manufactured by JASCO Cooperation, IRT-5200) is used. For example, a sliced piece is cut out from the resin molded article including polypropylene (hereinafter referred to as PP) as the thermoplastic resin, PA 11 as the specific resin, and maleic acid-modified polypropylene (hereinafter referred to as MA-PP) as the modified polyolefin, and a cross-section thereof is observed. IR mapping of the coating layer around the cross-section of the carbon fiber is performed to confirm maleic anhydride (1,820 $cm^{-1}$ to 1,750 $cm^{-1}$) derived from the coating layer-compatibilized layer. As a result, it may be confirmed that the layer of the compatibilizer (binding layer) is interposed between the coating layer and the thermoplastic resin. Specifically, when MA-PP and PA 11 are reacting, the cyclic maleation portion of MA-PP is ring-opened and the amine residue of PA 66 chemically bonds to reduce the cyclic maleation portion, so that it may be confirmed that the layer of the compatibilizer (binding layer) is interposed between the coating layer and the thermoplastic resin.

Even in a case where a specific resin other than PA11 such as PA6, PA12 or the like is applied, it may be confirmed by the same method as above.

Hereinafter, the details of each component of the resin composition according to the exemplary embodiment will be described.

Thermoplastic Resin (A)

The thermoplastic resin is the matrix of the resin composition and a resin component which is reinforced by the carbon fiber (also referred to as "matrix resin").

The thermoplastic resin is not particularly limited, and examples thereof include polyolefin (PO), polyphenylene sulfide (PPS), polyamide (PA), polyimide (PI), polyamide imide (PAI), polyether imide (PEI), polyether ether ketone (PEEK), polyether sulfone (PES), polyphenyl sulfone (PPSU), polysulfone (PSF), polyethylene terephthalate (PET), polybutylene terephthalate (PBT), polyacetal (POM), polycarbonate (PC), polyvinylidene fluoride (PVDF), acrylonitrile-butadiene-styrene copolymers (ABS), and acrylonitrile styrene (AS).

Among these thermoplastic resins, one type may be used alone, or two or more types may be used in combination.

Among these, polyolefin (PO) is preferable from the viewpoints of further improving bending elastic modulus and reducing the cost.

Polyolefin is a resin containing a repeating unit derived from an olefin and may contain another repeating unit derived from a monomer other than olefin as long as polyolefin is 30% by weight or less with respect to the total weight of the resin.

Polyolefin is obtained by addition polymerization of olefin (optionally, the monomer other than olefin).

In addition, regarding each of the olefin and the monomer other than olefin for obtaining polyolefin, one type may be used alone, or two or more types may be used in combination.

The polyolefin may be a copolymer or a homopolymer. In addition, the polyolefin may be linear or branched.

Examples of the olefin described herein include linear or branched aliphatic olefins and alicyclic olefins.

Examples of the aliphatic olefins include α-olefins such as ethylene, propylene, 1-butene, 1-hexene, 4-methyl-1-pentene, 1-octene, 1-decene, 1-hexadecene, and 1-octadecene.

In addition, examples of the alicyclic olefins include cyclopentene, cycloheptene, norbornene, 5-methyl-2-norbornene, tetracyclododecene, and vinylcyclohexane.

Among these, from the viewpoint of reducing the cost, α-olefin is preferable, ethylene or propylene is more preferable, and propylene is still more preferable.

In addition, the monomer other than olefin is selected from well-known addition-polymerizable compounds.

Examples of the addition-polymerizable compounds include: styrenes such as styrene, methylstyrene, α-methylstyrene, β-methylstyrene, t-butylstyrene, chlorostyrene, chloromethylstyrene, methoxystyrene, styrenesulfonic acid, and salts thereof; (meth)acrylates such as alkyl (meth)acrylate, benzyl (meth)acrylate, and dimethylaminoethyl (meth)acrylate; halovinyls such as vinyl chloride; vinyl esters such as vinyl acetate and vinyl propionate; vinyl ethers such as vinyl methyl ether; vinylidene halides such as vinylidene chloride; and N-vinyl compounds such as N-vinylpyrrolidone.

Examples of preferable polyolefin include polypropylene (PP; for example, melting temperature 165° C.), polyethylene (PE; for example, melting temperature 120° C.), and the like.

Among these, the resin containing only the repeating unit derived from olefin is preferable. In particular, from the viewpoint of reducing the cost, polypropylene is preferable.

The molecular weight of the thermoplastic resin is not particularly limited, and may be determined according to the type of resin, molding conditions, and the use of the resin molded article. For example, when the thermoplastic resin is the polyolefin, the weight average molecular weight (Mw) thereof is preferably in a range of 10,000 to 300,000 and more preferably in a range of 10,000 to 200,000.

As in the case of the molecular weight, the glass transition temperature (Tg) or melting temperature (Tm) of the thermoplastic resin is not particularly limited, and may be determined according to the type of the resin, molding conditions, and the use of the resin molded article. For example, when the thermoplastic resin is polyolefin, the melting temperature (Tm) thereof is preferably in a range of 100° C. to 300° C., more preferably in a range of 150° C. to 250° C., still more preferably from 150° C. to 200° C., and most preferably from 160° C. to 190° C.

The weight average molecular weight (Mw) and melting temperature (Tm) of polyolefin are a value measured using the following method.

That is, the weight average molecular weight (Mw) of polyolefin is measured by gel permeation chromatography (GPC) under the following conditions. As a GPC system, a high-temperature GPC system "HLC-8321 GPC/HT" is used. As an eluent, o-dichlorobenzene is used. Polyolefin is dissolved in o-dichlorobenzene at a high temperature (140° C. to 150° C.), and the solution is filtered to obtain the filtrate as a measurement sample. The measurement is performed using an RI detector under the following measurement conditions of sample concentration: 0.5%, flow rate: 0.6 ml/min, and sample injection amount: 10 μl. In addition, a calibration curve is prepared from 10 samples, "Polystyrene Standard Sample TSK Standard": "A-500", "F-1", "F-10", "F-80", "F-380", "A-2500", "F-4", "F-40", "F-128", and "F-700" (manufactured by Tosoh Corporation).

In addition, the melting temperature (Tm) of polyolefin is calculated from the DSC curve obtained from differential scanning calorimetry (DSC) according to a "melting peak temperature" described in a method of calculating melting temperature in "Testing methods for transition temperatures of plastics" of JIS K7121-1987.

The content of the thermoplastic resin as the matrix may be determined according to, for example, the use of the resin molded article. For example, the content of the thermoplastic resin is preferably from 5% by weight to 95% by weight, more preferably from 10% by weight to 95% by weight, and still more preferably from 20% by weight to 95% by weight with respect to the total weight of the resin composition.

In a case where the polyolefin is used as the thermoplastic resin, the content of polyolefin is preferably 20% by weight or higher with respect to the total weight of the thermoplastic resin.

Carbon Fiber

As the carbon fiber, a well-known carbon fiber is used, and any one of a PAN carbon fiber and a pitch carbon fiber is used.

The carbon fiber may undergo a well-known surface treatment.

Examples of the surface treatment for the carbon fiber include an oxidation treatment and a sizing treatment.

The form of the carbon fiber is not particularly limited, and may be selected according to the use of the resin molded article. Examples of the form of the carbon fiber include a fiber bundle including a large number of single fibers, a bundled fiber bundle, and a woven fabric in which fibers are two-dimensionally or three-dimensionally woven.

The fiber diameter, the fiber length, and the like of the carbon fiber are not particularly limited, and may be selected according to the use of the resin molded article.

Here, even if the fiber length of the carbon fiber is short, since the resin molded article having superior mechanical strength, particularly bending elastic modulus may be obtained, the average fiber length of the carbon fibers may be from 0.1 mm to 5.0 mm (preferably from 0.2 mm to 2.0 mm).

In addition, the average diameter of the carbon fibers may be, for example, from 5.0 μm or to 10.0 μm (preferably from 6.0 μm to 8.0 μm).

Here, the measurement method of the average fiber length of the carbon fibers is as follows. The carbon fiber is observed with an optical microscope at a magnification of 100 times to measure the length of the carbon fiber. The measurement is performed for 200 carbon fibers, and the average value thereof is taken as the average fiber length of the carbon fibers.

On the other hand, the measurement method of the average diameter of carbon fibers is as follows. A cross-section perpendicular to the longitudinal direction of the carbon fiber is observed with a scanning electron microscope (SEM) at a magnification of 1,000 times to measure the diameter of the carbon fiber. The measurement is performed for 100 carbon fibers, and the average value thereof is taken as the average diameter of the carbon fibers.

When the fiber length of the carbon fiber is shortened, the resin reinforcing capacity of the carbon fiber tends to deteriorate. In particular, due to recent demands for recycling, it is also promoted to pulverize and recycle the resin molded article reinforced with the carbon fiber, and the fiber length of the carbon fiber is shortened during pulverizing the resin molded article. In addition, the fiber length of the carbon fiber is short during heat molten-kneading when preparing the resin composition in some cases. Therefore, when the resin molded article is molded from the resin composition containing the carbon fiber whose fiber length is shortened, the mechanical strength, particularly the bending elastic modulus, tends to be deteriorated.

However, even when the resin molded article containing the carbon fiber is pulverized, recycled product in which the carbon fiber is converted to the short fiber is used as a raw material, or the carbon fiber is converted to the short fiber during heat molten-kneading, the resin composition according to the exemplary embodiment is useful because the resin molded article having superior bending elastic modulus may be obtained.

As the carbon fiber, a commercially available product may be used.

Examples of a commercially available product of the PAN carbon fiber include "TORAYCA" (registered trade name; manufactured by Toray Industries Inc.), "TENAX" (manufactured by Toho Tenax Co., Ltd.), and "PYROFIL" (registered trade name; manufactured by Mitsubishi Rayon Co., Ltd.). Other examples of a commercially available product of the PAN carbon fiber include commercially available products manufactured by Hexcel Corporation, Cytec Industries Inc., Dow-Aksa, Formosa Plastics Group, and SGL Carbon Japan Co., Ltd.

Examples of a commercially available product of the pitch carbon fiber include "DIALEAD" (registered trade name; manufactured by Mitsubishi Rayon Co., Ltd.), "GRANOC" (manufactured by Nippon Graphite Fiber Co., Ltd.), and "KUREKA" (manufactured by Kureha Corporation). Other examples of a commercially available product of the pitch carbon fiber include commercially available products manufactured by Osaka Gas Chemical Co., Ltd., and Cytec Industries Inc.

Among these carbon fibers, one type may be used alone, or two or more types may be used in combination.

The content of the carbon fiber is preferably from 0.1 parts by weight to 200 parts by weight, more preferably from 1 part by weight to 180 parts by weight, and still more preferably from 5 parts by weight to 150 parts by weight with respect to 100 parts by weight of the thermoplastic resin.

By adjusting the content of the carbon fiber to be 0.1 parts by weight or more with respect to 100 parts by weight of the thermoplastic resin, the resin composition is reinforced. In addition, by adjusting the content of the carbon fiber to be 200 parts by weight or less with respect to 100 parts by weight of the thermoplastic resin, the moldability during the preparation of the resin molded article is superior.

In a case where the reinforcing fiber other than the carbon fiber is used, it is preferable to use the carbon fiber in an amount of 80% by weight or higher with respect to the total weight of the reinforcing fiber.

Hereinafter, the content (part(s) by weight) with respect to 100 parts by weight of the thermoplastic resin will be abbreviated as "phr (per hundred resin)" in some cases.

In a case where this abbreviation is used, the content of the carbon fiber is from 0.1 phr to 200 phr.

Resin Containing at Least One of Amide Bond and Imide Bond (Specific Resin)

The specific resin contains a specific partial structure and is a resin that may coat around the carbon fiber as described above.

This specific resin will be described in detail.

The specific resin is preferably a resin having a low compatibility with the thermoplastic resin, specifically a resin having a solubility parameter (SP value) different from the solubility parameter of the thermoplastic resin.

Here, the difference between the SP value of the thermoplastic resin and the SP value of the specific resin is preferably 3 or more, and more preferably from 3 to 6, from the viewpoints of compatibility therebetween and repulsion therebetween.

The SP value is a value calculated according to Fedor's method. Specifically, the solubility parameter (SP value) may be calculated, for example, using the following expression according to the description of Polym. Eng. Sci., vol. 14, p. 147 (1974).

$$\text{SP Value} = \sqrt{(Ev/v)} = \sqrt{(\Sigma\Delta ei/\Sigma\Delta vi)} \quad \text{Expression:}$$

(Here, Ev: evaporation energy (cal/mol), v: molar volume (cm$^3$/mol), $\Delta ei$: evaporation energy of each of atoms or an atom group, $\Delta vi$: molar volume of each of atoms or an atom group)

(cal/cm$^3$)$^{1/2}$ is adopted for the unit of the solubility parameter (SP values). However, the unit will be omitted in accordance with customs, and the SP values will be represented in a dimensionless form.

In addition, the specific resin contains at least one of an imide bond and an amide bond in the molecules thereof.

By containing the imide bond or the amide bond, the specific resin exhibits affinity to a polar group present on a surface of the carbon fiber.

Regardless of the melting temperature of the specific resin, the difference between the melting temperature of the specific resin and the melting temperature of the thermoplastic resin may be 90° C. or less. When the difference between the melting temperature of the specific resin and the melting temperature of the thermoplastic resin is 90° C. or less, superior low temperature moldability is obtained. The difference between the melting temperature of the specific resin and the melting temperature of the thermoplastic resin is preferably from 0° C. to 80° C., and more preferably from 0° C. to 50° C., from the viewpoint of further improving the low temperature moldability.

In the present specification, the difference between the melting temperature of the specific resin and the melting temperature of the thermoplastic resin means a value obtained by subtracting the melting temperature of the thermoplastic resin from the melting temperature of the specific resin. That is, when the melting temperature of the specific resin is TmA and the melting temperature of the thermoplastic resin is TmB, the difference $\Delta$TmAB between the melting temperatures of both is represented by $\Delta$TmAB=TmA−TmB. The difference $\Delta$TmAB between the melting temperatures of both may be a negative value.

Here, as long as the difference between the melting temperature of the specific resin and the melting temperature of the thermoplastic resin is in the above-described range, one type of specific resin may be used alone, or two or more types may be used in combination. In a case where two or more types of specific resins are used in combination, the melting temperature of the specific resin having the largest difference in the melting temperature with the thermoplastic resin is TmA.

Specific examples of the specific resin include a thermoplastic resin containing at least one of an imide bond and an amide bond in the main chain, and specific examples thereof include polyamide (PA), polyimide (PI), polyamide imide (PAI), polyether imide (PEI), and polyamino acid.

It is preferable that the specific resin has low compatibility to the thermoplastic resin and has an SP value different from that of the thermoplastic resin. Therefore, it is preferable that the specific resin is a different type of thermoplastic resin from that of the thermoplastic resin as the matrix.

Among these, polyamide (PA) is preferable from the viewpoints of superior low temperature moldability, further improving bending elastic modulus, and obtaining superior adhesion to the carbon fiber.

Examples of the polyamide include polyamide obtained by co-polycondensing dicarboxylic acid and diamine and polyamide obtained by condensing lactam. That is, as the polyamide, polyamide having at least one of a structural unit in which dicarboxylic acid and diamine are condensation-polymerized, and a structural unit in which lactam is ring-opened may be mentioned.

Polyamide is a structural unit in which dicarboxylic acid and diamine are condensation-polymerized, or a structural unit in which lactam is ring-opened, and may be either polyamide having a structural unit containing an aromatic ring excluding aramid, polyamide having a structural unit not containing the aromatic ring, or polyamide having a structural unit containing the aromatic ring excluding an aramid structural unit and a structural unit not containing the aromatic ring, but from the viewpoint of the bending elastic modulus, it is preferable that the polyamide is polyamide having the structural unit containing the aromatic ring excluding the aramid structural unit and the structural unit not containing the aromatic ring.

In particular, when the polyamide having the structural unit containing the aromatic ring excluding the aramid structural unit and the structural unit not containing the aromatic ring is applied as the polyamide, the affinity between the carbon fiber and the thermoplastic resin is improved. Here, polyamide having only the structural unit containing the aromatic ring tends to have higher affinity with the carbon fiber and lower affinity with the thermoplastic resin than polyamide having only the structural unit not containing the aromatic ring. The polyamide having only the structural unit not containing the aromatic ring tends to have the lower affinity with the carbon fiber and the higher affinity with the thermoplastic resin than the polyamide having only the structural unit containing the aromatic ring. Therefore, by applying the polyamide having both structural units, the affinity with both of the carbon fiber and the thermoplastic resin is improved, and the adhesion at the interface between the carbon fiber and the thermoplastic resin is further enhanced by the coating layer of the polyamide. Therefore, it is easy to obtain the resin molded article having superior mechanical strength, particularly bending elastic modulus.

In addition, when the polyamide having the structural unit containing the aromatic ring excluding the aramid structural unit and the structural unit not containing the aromatic ring is used as the polyamide, the melt viscosity deteriorates and the moldability (for example, injection moldability) also improves. Therefore, the resin molded article having high appearance quality is easily obtained.

When polyamide having only aramid structural unit is applied as polyamide, thermal degradation of the thermoplastic resin is caused at high temperatures at which the polyamide may melt. In addition, at a temperature at which thermal degradation of the thermoplastic resin is caused, the polyamide may not be sufficiently melted, the moldability (for example, injection moldability) is deteriorated, and the appearance quality and the mechanical performance of the obtained resin molded article are deteriorated.

The aromatic ring means a monocyclic aromatic ring (cyclopentadiene and benzene) having 5-membered or more rings, and a condensed ring (naphthalene, and the like) condensed with plural monocyclic aromatic rings having 5-membered or more rings. The aromatic ring also includes a heterocyclic ring (pyridine, and the like).

In addition, "aramid structural unit" refers to a structural unit obtained by polycondensation reaction between dicarboxylic acid containing the aromatic ring and diamine containing the aromatic ring.

Here, examples of the structural unit containing an aromatic ring excluding the aramid structural unit include at least one of the following structural units (1) and (2).

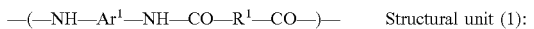    Structural unit (1):

(In the structural unit (1), $Ar^1$ represents a divalent organic group containing an aromatic ring. $R^1$ represents a divalent organic group not containing the aromatic ring.)

    Structural unit (2):

(In the structural unit (2), $Ar^2$ represents a divalent organic group containing the aromatic ring. $R^2$ represents a divalent organic group not containing the aromatic ring.)

On the other hand, examples of the structural unit not containing an aromatic ring include at least one of the following structural units (3) and (4).

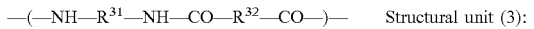    Structural unit (3):

(In the structural unit (3), $R^{31}$ represents a divalent organic group not containing the aromatic ring. $R^{32}$ represents a divalent organic group not containing the aromatic ring.)

    Structural unit (4):

(In the structural unit (4), $R^4$ represents a divalent organic group not containing the aromatic ring.)

In structural formulas (1) to (3), the "divalent organic group" represented by each symbol is an organic group derived from a divalent organic group possessed by dicarboxylic acid, diamine, or lactam. Specifically, for example, in the structural unit (1), "divalent organic group containing the aromatic ring" represented by $Ar^1$ represents a residue obtained by removing two amino groups from diamine, and "divalent organic group not containing the aromatic ring" represented by $R^1$ represents a residue obtained by removing two carboxy groups from dicarboxylic acid. In addition, for example, in the structural unit (4), "divalent organic group not containing the aromatic ring" represented by $R^4$ is an organic group interposed between "NH group" and "CO group" when the lactam is ring-opened.

As the polyamide, the copolymerized polyamide may be used as long as the difference between the melting temperature of the thermoplastic resin and the melting temperature of the polyamide is in the above-described range. In addition, mixed polyamide may be used, and the copolymerized polyamide and the mixed polyamide may be used in combination. Among these, the mixed polyamide is preferable as the polyamide from the viewpoint of a further improvement in the mechanical strength, particularly the bending elastic modulus.

The copolymerized polyamide is, for example, the copolymerized polyamide obtained by copolymerizing the polyamide having the structural unit containing the aromatic ring excluding the aramid structural unit and the polyamide having the structural unit not containing the aromatic ring.

The mixed polyamide is, for example, the mixed polyamide containing the polyamide having the aromatic ring and the polyamide having no aromatic ring.

In the copolymerized polyamide, the proportion between the aromatic polyamide and the aliphatic polyamide (aromatic polyamide/aliphatic polyamide) is preferably from 20/80 to 99/1 (preferably from 50/50 to 96/4) by weight ratio from the viewpoint of a further improvement in the mechanical strength, particularly the bending elastic modulus.

On the other hand, in the mixed polyamide, the proportion between the aromatic polyamide and the aliphatic polyamide (aromatic polyamide/aliphatic polyamide) is preferably from 20/80 to 99/1 (preferably from 50/50 to 96/4) by weight ratio from the viewpoint of a further improvement in the mechanical strength, particularly the bending elastic modulus.

In the aromatic polyamide, the proportion of the structural unit containing an aromatic ring is preferably 80% by weight or more (preferably 90% by weight or more, and more preferably 100% by weight or more) with respect to the total structural units.

On the other hand, in the aliphatic polyamide, the proportion of the structural unit not containing an aromatic ring is preferably 80% by weight or more (preferably 90% by weight or more, and more preferably 100% by weight or more) with respect to the total structural units.

Examples of the aromatic polyamide include a condensation polymer of dicarboxylic acid containing the aromatic ring and diamine not containing the aromatic ring, and a condensation polymer of dicarboxylic acid not containing the aromatic ring and diamine containing the aromatic ring.

Examples of the aliphatic polyamide include a condensation polymer of dicarboxylic acid not containing the aromatic ring and diamine not containing the aromatic ring, and the like. A ring-opening polycondensate of lactam not containing the aromatic ring, and the like may be mentioned.

Here, examples of the dicarboxylic acid containing the aromatic ring include phthalic acid (terephthalic acid, isophthalic acid, and the like), biphenyldicarboxylic acid, and the like.

Examples of the dicarboxylic acid not containing the aromatic ring include oxalic acid, adipic acid, suberic acid, sebacic acid, 1,4-cyclohexanedicarboxylic acid, malonic acid, succinic acid, glutaric acid, pimelic acid, azelaic acid, and the like.

Examples of the diamine containing the aromatic ring include p-phenylenediamine, m-phenylenediamine, m-xylenediamine, diaminodiphenylmethane, diaminodiphenyl ether, and the like.

Examples of the diamine not containing the aromatic ring include ethylenediamine, pentamethylenediamine, hexamethylenediamine, nonanediamine, decamethylenediamine, 1,4-cyclohexanediamine, and the like.

Examples of the lactam not containing the aromatic ring include ε-caprolactam, undecane lactam, lauryl lactam, and the like.

Each dicarboxylic acid, each diamine, and each lactam may be used alone or two or more types may be used in combination.

Examples of aromatic polyamides include MXD6 (condensation polymer of adipic acid and metaxylene diamine; melting temperature 237° C.), NYLON6T (condensation polymer of terephthalic acid and hexamethylenediamine; melting temperature 310° C.), NYLON9T (polycondensate of terephthalic acid and nonanediamine; melting temperature 306° C.), and the like.

Examples of commercially available products of aromatic polyamide include "MXD6" manufactured by Mitsubishi Gas Chemical Company, "GENESTAR (registered trade name): PA6T" manufactured by Kuraray Co., Ltd., "GENESTAR (registered trade name): PA5T" manufactured by Kuraray Co., Ltd., "TY-502NZ: PA6T" manufactured by Toyobo Co., Ltd., and the like.

Examples of aliphatic polyamides include NYLON6 (ring-opening polycondensate of ε-caprolactam; melting temperature 225° C.), NYLON11 (ring-opening polycondensate of undecane lactam; melting temperature 185° C.), NYLON12 (ring-opening polycondensate of lauryllactam; melting temperature 175° C.), NYLON66 (condensation polymer of adipic acid and hexamethylenediamine; melting temperature 260° C.), NYLON610 (condensation polymer of sebacic acid and hexamethylenediamine; melting temperature 225° C.), NYLON612 (condensation polymer of caprolactam (carbon number 6) and lauryllactam (carbon number 12): melting temperature 220° C.), and the like.

Examples of commercially available aliphatic polyamides include "ZYTEL (registered trade name): 7331J (PA6)" manufactured by Dupont, "ZYTEL (registered trade name): 101L (PA66)" manufactured by Dupont, and the like.

In a case where the thermoplastic resin is polypropylene, the polyamide may contain at least one selected from the group consisting of MXD6, NYLON6, NYLON11, and NYLON12 among these polyamides, and preferably contains at least one of NYLON11 and NYLON12. Among these, NYLON12 is more preferable.

In addition, in a case where the thermoplastic resin is polyethylene, NYLON11 and NYLON12 are preferable as the polyamide.

The proportion of the aromatic rings of the polyamide (copolymerized polyamide and mixed polyamide) is preferably from 1% by weight to 55% by weight, more preferably from 5% by weight to 50% by weight, and still more preferably from 10% by weight to 40% by weight, from the viewpoint of further improvement in the mechanical strength, particularly the bending elastic modulus.

The proportion of the aromatic ring in the mixed polyamide is the proportion of the aromatic ring with respect to the total of the aromatic polyamide and the aliphatic polyamide.

Here, the proportion of the aromatic ring of the polyamide means the total proportion of "monocyclic aromatic ring and condensed ring formed by condensation of a monocyclic aromatic ring" contained in the polyamide. In the calculation of the proportion of the aromatic ring of the polyamide, the monocyclic aromatic ring and the substituent substituted on the condensed ring in which the monocyclic aromatic ring is condensed are excluded.

Physical properties of the specific resin will be described. The molecular weight of the specific resin is not particularly limited as long as the specific resin is likely to be thermally melted than the thermoplastic resin which is present together in the resin composition. When the specific resin is polyamide, for example, the weight average molecular weight of the polyamide is preferably in a range of 10,000 to 300,000 and more preferably in a range of 10,000 to 100,000.

In addition, as in the case of the molecular weight, the glass transition temperature or melting temperature of the specific resin is not particularly limited as long as the specific resin is likely to be thermally melted than the thermoplastic resin which is present together in the resin composition. For example, when the specific resin is polyamide, the melting temperature (Tm) of polyamide is preferably in a range of 100° C. to 400° C., more preferably in a range of 150° C. to 350° C., still more preferably from 150° C. to 250° C., and most preferably from 160° C. to 240° C.

The melting temperature (Tm) of the polyamide may be determined by the same method as the measurement of the melting temperature of the polyolefin described above. That is, the melting temperature is determined from the DSC curve obtained from differential scanning calorimetry (DSC) according to the "melting peak temperature" described in a method of calculating melting temperature in "Testing methods for transition temperatures of plastics" of JIS K7121-1987.

The content of the specific resin is preferably from 0.1 parts by weight to 100 parts by weight, more preferably from 0.5 parts by weight to 90 parts by weight, and still more preferably from 1 part by weight to 80 parts by weight with respect to 100 parts by weight of the thermoplastic resin, from the viewpoint of further improving the mechanical strength, particularly the bending elastic modulus.

By adjusting the content of the specific resin to be within the above-described range, the affinity to the carbon fiber is enhanced, and the mechanical strength, particularly the bending elastic modulus may be improved.

In particular, when the specific resin is contained in a large amount within a range of greater than 20 parts by weight and 100 parts by weight or less with respect to 100 parts by weight of the thermoplastic resin, the amount of the compatibilizer becomes relatively small with respect to the specific resin amount, the specific resin hardly spreads in the thermoplastic resin, and the tendency to localize around the carbon fiber increases. Accordingly, it is presumed that the coating layer foamed of the specific resin is formed in a substantially uniform state while forming a thick film to some extent over the entire circumference of the carbon fiber having a short fiber length. Therefore, the adhesion at the interface between the carbon fiber and the thermoplastic resin is enhanced, and the resin molded article having superior mechanical strength, particularly bending elastic modulus, is easily obtained.

From the viewpoint of effectively exhibiting the affinity to the carbon fiber, it is preferable that the content of the specific resin is proportional to the above-described content of the carbon fiber.

The content of the specific resin is preferably from 0.1% by weight to 200% by weight, more preferably from 1% by weight to 150% by weight, and still more preferably from 1% by weight to 120% by weight with respect to the weight of the carbon fiber.

When the content of the specific resin is 0.1% by weight or higher with respect to the weight of the carbon fiber, the affinity between the carbon fiber and the specific resin is likely to be enhanced. When the content of the specific resin is 200% by weight or lower, resin fluidity is improved.

Compatibilizer

The compatibilizer is a resin that enhances the affinity between the thermoplastic resin and the specific resin.

The compatibilizer may be determined according to the thermoplastic resin.

It is preferable that the compatibilizer has the same structure as the thermoplastic resin and contains a portion having affinity to the specific resin in a part of the molecules.

For example, in a case where polyolefin is used as the thermoplastic resin, modified polyolefin may be used as the compatibilizer.

Here, when the thermoplastic resin is polypropylene (PP), modified polypropylene (PP) is preferable as the modified polyolefin. Likewise, when the thermoplastic resin is an ethylene-vinyl acetate copolymer resin (EVA), a modified ethylene-vinyl acetate copolymer resin (EVA) is preferable as the modified polyolefin.

Examples of the modified polyolefin include polyolefins into which a modification site containing a carboxy group, a carboxylic anhydride residue, a carboxylate residue, an imino group, an amino group, an epoxy group, or the like is introduced.

From the viewpoints of further improving the affinity between the polyolefin and the specific resin and considering the upper limit temperature during molding, the modification site to be introduced into the polyolefin preferably contains a carboxylic anhydride residue, and in particular, more preferably contains a maleic anhydride residue.

The modified polyolefin may be obtained using, for example, a method of causing a compound containing the above-described modification site to react with polyolefin such that the modification site is directly chemically bonded to polyolefin or a method of forming a graft chain using a compound containing the above-described modification site and bonding the graft chain to polyolefin.

Examples of the compound containing the above-described modification site include maleic anhydride, fumaric anhydride, citric anhydride, N-phenylmaleimide, N-cyclohexylmaleimide, glycidyl (meth)acrylate, glycidyl vinylbenzoate, N-[4-(2,3-epoxypropoxy)-3,5-dimethylbenzyl]acrylamide, alkyl (meth)acrylate, and derivatives thereof.

In particular, modified polyolefin obtained by causing a reaction between maleic anhydride as an unsaturated carboxylic acid to react with polyolefin is preferable.

Specific examples of the modified polyolefin include acid-modified polyolefins such as maleic anhydride-modified polypropylene, maleic anhydride-modified polyethylene, a maleic anhydride-modified ethylene-vinyl acetate copolymer resin (EVA), and adducts or copolymers thereof.

As the modified polyolefin, a commercially available product may be used.

Examples of the modified propylene include YOUMEX (registered trade name) series (100TS, 110TS, 1001, 1010) manufactured by Sanyo Chemical Industries, Ltd.

Examples of the modified polyethylene include YOUMEX (registered trade name) series (2000) manufactured by Sanyo Chemical Industries, Ltd. and MODIC (registered trade name) series manufactured by Mitsubishi Chemical Corporation.

Examples of the modified ethylene-vinyl acetate copolymer resin (EVA) include MODIC (registered trade name) series manufactured by Mitsubishi Chemical Corporation.

The molecular weight of the compatibilizer is not particularly limited and, from the viewpoint of workability, is preferably from 5,000 to 100,000 and more preferably 5,000 to 80,000.

The content of the compatibilizer is preferably from 0.1 parts by weight to 50 parts by weight, more preferably from 0.1 parts by weight to 40 parts by weight, and still more preferably from 0.1 parts by weight to 30 parts by weight with respect to 100 parts by weight of the thermoplastic resin.

The content of the compatibilizer is preferably from 1 part by weight to 50 parts by weight, more preferably from 5 parts by weight to 50 parts by weight, and still more preferably from 10 parts by weight to 50 parts by weight with respect to 100 parts by weight of the specific resin.

By adjusting the content of the compatibilizer to be within the above-described range, the affinity between the thermoplastic resin and the specific resin is enhanced, and the mechanical strength, particularly the bending elastic modulus may be improved.

From the viewpoint of enhancing the affinity between the thermoplastic resin and the specific resin, it is preferable that the content of the compatibilizer is proportional to the content of the specific resin (is indirectly proportional to the content of the carbon fiber).

The content of the compatibilizer is preferably from 1% by weight to 50% by weight, more preferably from 1% by weight to 40% by weight, and still more preferably from 1% by weight to 30% by weight with respect to the weight of the carbon fiber.

When the content of the compatibilizer is 1% by weight or higher with respect to the weight of the carbon fiber, the affinity between the carbon fiber and the specific resin is likely to be obtained. When the content of the compatibilizer is 50% by weight or lower (in particular, 30% by weight or lower), the remaining of an unreacted functional group caused by discoloration or deterioration is prevented.

Other Components

The resin composition according to the exemplary embodiment may contain other components in addition to the above-described components.

Examples of the other components include well-known additives such as a flame retardant, a flame retardant auxiliary agent, a dripping inhibitor during heating, a plasticizer, an antioxidant, a release agent, alight resistant agent, a weather resistant agent, a colorant, a pigment, a modifier, an antistatic agent, a hydrolysis inhibitor, a filler, and a reinforcing agent other than the carbon fiber (for example, talc, clay, mica, glass flake, milled glass, glass beads, crystalline silica, alumina, silicon nitride, aluminum nitride, or boron nitride).

The content of the other components is preferably from 0 parts by weight to 10 parts by weight and more preferably from 0 parts by weight to 5 parts by weight with respect to 100 parts by weight of the thermoplastic resin. Here, "0 parts by weight" represents that the resin composition does not contain other components.

Method of Preparing Resin Composition

The resin composition according to the exemplary embodiment is prepared by molten-kneading the respective components.

Here, a well-known unit is used as a molten-kneading unit, and examples thereof include a twin-screw extruder, a HENSCHEL MIXER, a BUNBURY MIXER, a single-screw extruder, a multi-screw extruder, and a co-kneader.

The temperature (cylinder temperature) during molten-kneading may be determined according to, for example, the melting temperature of the resin components constituting the resin composition.

In particular, it is preferable that the resin composition according to the exemplary embodiment is obtained using a preparing method including molten-kneading the thermoplastic resin, the carbon fiber, the specific resin, and the compatibilizer. When the thermoplastic resin, the carbon fiber, the specific resin, and the compatibilizer are collectively molten-kneaded, the coating layer which is formed around the carbon fiber using the specific resin is likely to be thin and substantially uniform and has high mechanical strength, particularly bending elastic modulus.

Resin Molded Article

The resin molded article according to the exemplary embodiment contains the thermoplastic resin, the carbon fiber, the specific resin, and the compatibilizer. That is, the resin molded article according to the exemplary embodiment has the same composition as the resin composition according to the exemplary embodiment.

The resin molded article according to the exemplary embodiment may be obtained by preparing the resin composition according to the exemplary embodiment and molding the resin composition, or may be obtained by preparing a composition containing components other than the carbon fiber and mixing the composition with the carbon fiber during molding.

Examples of a molding method include injection molding, extrusion molding, blow molding, hot press molding, calendering, coating molding, cast molding, dipping molding, vacuum molding, and transfer molding.

As the molding method of the resin molded article according to the exemplary embodiment, injection molding is preferable from the viewpoint of obtaining a high degree of freedom for the shape.

The cylinder temperature during injection molding is, for example, from 180° C. to 300° C. and preferably from 200° C. to 280° C. The mold temperature during injection molding is, for example, from 30° C. to 100° C. and preferably from 30° C. to 60° C.

The injection molding may be performed using a commercially available machine such as "NEX150" (manufactured by Nissei Plastic Industrial Co., Ltd.), "NEX300" (manufactured by Nissei Plastic Industrial Co., Ltd.), SE50D (manufactured by Sumitomo Machinery Co., Ltd.), and the like.

The resin molded article according to the exemplary embodiment is preferably used in applications such as electronic and electric apparatuses, business machines, home electronics, automobile interior materials, and containers. Specific examples of the applications include: cases of electronic and electric apparatuses and home electronics; various components of electronic and electric apparatuses and home electronics, automobile interior components; storage cases of CD-ROM, DVD, and the like; tableware; beverage bottles; food trays; wrapping materials; films; and sheets.

In particular, in the resin molded article according to the exemplary embodiment, the carbon fiber is used as the reinforcing fiber, and thus the mechanical strength, particularly the bending elastic modulus is superior. Therefore, the resin molded article according to the exemplary embodiment is preferable as an alternative to a metal component.

EXAMPLES

Hereinafter, the invention will be described in more detail using Examples but is not limited to these examples.

Examples 1 to 14 and Comparative Examples 1 to 7

The components shown in Tables 1 and 2 (numerical values in the tables represent the number of parts) are kneaded by means of a twin-screw extruder (TEM58SS, manufactured by Toshiba Machine Co., Ltd.) at a melt-kneading temperature (cylinder temperature) shown in the following kneading conditions and Tables 1 and 2 to prepare pellets corresponding to each of the resin compositions.

The obtained pellets are baked at 600° C. for 2 hours, and the average fiber length of the remaining carbon fibers is measured by the method described above. The measurement results are shown in Tables 1 and 2.

Kneading Conditions
Screw diameter: ϕ 58 mm
Rotation speed: 300 rpm
Discharge nozzle diameter: 1 mm The obtained pellets are molded by means of an injection molding machine (NEX150, manufactured by Nissei Plastic Industrial Co., Ltd.) at an injection molding temperature (cylinder temperature) shown in Tables 1 and 2 and a mold temperature of 50° C. to obtain ISO multi-purpose dumbbell specimens (corresponding to ISO 527 tensile test and ISO 178 bending test; thickness: 4 mm, width: 10 mm) and D2 specimens (length: 60 mm, width: 60 mm, thickness: 2 mm).

Evaluation

Using the two types of specimens obtained, the following evaluation is performed.

The evaluation results are shown in Tables 1 and 2.

Surface Uniformity of Resin Molded Article

The surface uniformity of the resin molded article is evaluated in the following manner.

According to Tables 1 and 2, resin pellets including compositions whose compositions are adjusted are prepared, and thereafter a multipurpose test specimen type A1 having a thickness of 4 mm, namely a dumbbell specimen is molded from the pellets by an injection molding machine in accordance with JIS K7139.

Evaluation Criteria

A: Unevenness and defects are not observed on the surface of the molded article and the surface is uniform.

B: Molding defects such as unevenness and defects occur in less than 20% of the surface of the molded article.

C: Molding defects such as unevenness and defects occur in 20% or more of the surface of the molded article.

Evaluation of Odor

The odor of the resin molded article is evaluated in the following manner.

After molding, the molded article is kept at room temperature for 1 day, and thereafter placed in a plastic bag, and the tester smells the odor inside the plastic bag and evaluates the odor.

Evaluation Criteria

A: No scorched odor and modified amine odor.

B: Scorched odor and modified amine odor are slightly recognized.

C: Scorched odor and modified amine odor are strongly recognized.

Bending Elastic Modulus

Regarding each of the obtained ISO multi-purpose dumbbell specimens, the bending elastic modulus is measured using a universal tester (AUTOGRAPH AG-XPLUS, manufactured by Shimadzu Corporation) according to a method defined in ISO 178.

Tensile Elastic Modulus

Regarding each of the obtained ISO multi-purpose dumbbell specimens, the tensile elastic modulus and elongation are measured using an evaluation device (precision universal tester AUTOGRAPH AG-IS5 kN, manufactured by Shimadzu Corporation) according to a method defined in ISO 527.

Presence or Absence of Coating Layer

Using each of the obtained D2 specimens, the presence or absence of the coating layer containing the specific resin is determined in accordance with the method described above.

TABLE 1

| | Example | | Example 1 | Example 2 | Example 3 | Example 4 | Example 5 | Example 6 |
|---|---|---|---|---|---|---|---|---|
| Composition | Thermoplastic Resin | Polypropylene (Melting Temperature 165° C.) | 100 | 100 | 100 | 100 | 100 | 100 |
| | | Polyethylene (Melting Temperature 120° C.) | | | | | | |
| | Reinforcing Fiber | Carbon Fiber A (Surface-treated) | 10 | 50 | 100 | 200 | 10 | 200 |
| | | Carbon Fiber B (not Surface-treated) | | | | | | |
| | Specific Resin — Aliphatic PA | PA6 (Melting Temperature 225° C.) | | | | | | |
| | | PA11 (Melting Temperature 185° C.) | 20 | 60 | 80 | 100 | | |
| | | PA12 (Melting Temperature 175° C.) | | | | | 20 | 100 |
| | | PA66 (Melting Temperature 260° C.) | | | | | | |
| | Aromatic PA | MXD6 (Melting Temperature 237° C.) | | | | | | |
| | | PA9T (306° C.) | | | | | | |
| | Difference in Melting Temperature from Thermoplastic Resin (° C.) | | 20 | 20 | 20 | 20 | 10 | 10 |
| | Compatibilizer | Maleic Anhydride-modified Polypropylene | 5 | 10 | 30 | 50 | 5 | 50 |
| | | Maleic Anhydride-modified Polyethylene | | | | | | |
| | Total | | 135 | 220 | 310 | 450 | 135 | 450 |
| Conditions | Molten-kneading Temperature (° C.) | | 240 | 240 | 240 | 240 | 240 | 240 |
| | Injection Molding Temperature (° C.) | | 240 | 240 | 240 | 240 | 240 | 240 |
| | Surface Uniformity of Resin Molded Article | | A | A | A | A | A | A |
| | Evaluation of Odor | | A | A | A | A | A | A |
| | Bending Elastic Modulus (GPa) | | 7 | 15.2 | 17.2 | 20.2 | 7.2 | 18.8 |
| | Tensile Elastic Modulus (GPa) | | 8 | 14.2 | 18 | 18.8 | 7.8 | 17.6 |
| | Presence or Absence of Coating Layer | | Presence | Presence | Presence | Presence | Presence | Presence |
| | Average Fiber Length (mm) | | 0.7 | 0.7 | 0.7 | 0.7 | 0.7 | 0.7 |
| | Proportion of Aromatic Ring in Specific Resin (% by weight) | | 0 | 0 | 0 | 0 | 0 | 0 |
| | Number of Parts of Carbon Fiber (to 100 Parts of Thermoplastic Resin) | | 10 | 50 | 100 | 200 | 10 | 200 |
| | Number of Parts of Specific Resin (to 100 Parts of Thermoplastic Resin) | | 20 | 60 | 80 | 100 | 20 | 100 |
| | Number of Parts of Compatibilizer (to 100 Parts of Thermoplastic Resin) | | 5 | 10 | 30 | 50 | 5 | 50 |
| | % by weight of Specific Resin (to 100 Parts of Carbon Fiber) | | 200 | 120 | 80 | 50 | 200 | 50 |
| | % by weight of Compatibilizer (to 100 Parts of Carbon Fiber) | | 50 | 20 | 30 | 25 | 50 | 25 |
| | Number of Parts of Compatibilizer (to 100 Parts of Specific Resin) | | 25 | 17 | 38 | 50 | 25 | 50 |
| | Amount of Carbon Fiber occupied in Resin Molded Article (%) | | 7.4 | 22.7 | 32.3 | 44.4 | 7.4 | 44.4 |

| | Example | | Example 7 | Example 8 | Example 9 | Example 10 | Example 11 |
|---|---|---|---|---|---|---|---|
| Composition | Thermoplastic Resin | Polypropylene (Melting Temperature 165° C.) | 100 | | 100 | 100 | 100 |
| | | Polyethylene (Melting Temperature 120° C.) | | 100 | | | |
| | Reinforcing Fiber | Carbon Fiber A (Surface-treated) | | 200 | 10 | 200 | 10 |
| | | Carbon Fiber B (not Surface-treated) | 10 | | | | |
| | Specific Resin — Aliphatic PA | PA6 (Melting Temperature 225° C.) | | | 20 | 100 | |
| | | PA11 (Melting Temperature 185° C.) | | 100 | | | |
| | | PA12 (Melting Temperature 175° C.) | 20 | | | | |
| | | PA66 (Melting Temperature 260° C.) | | | | | |
| | Aromatic PA | MXD6 (Melting Temperature 237° C.) | | | | | 20 |
| | | PA9T (306° C.) | | | | | |
| | Difference in Melting Temperature from Thermoplastic Resin (° C.) | | 10 | 65 | 60 | 60 | 72 |
| | Compatibilizer | Maleic Anhydride-modified Polypropylene | 5 | | 5 | 50 | 5 |
| | | Maleic Anhydride-modified Polyethylene | | 50 | | | |
| | Total | | 135 | 450 | 135 | 450 | 135 |
| Conditions | Molten-kneading Temperature (° C.) | | 240 | 240 | 240 | 240 | 240 |
| | Injection Molding Temperature (° C.) | | 240 | 240 | 240 | 240 | 240 |

TABLE 1-continued

|  | | | | | |
|---|---|---|---|---|---|
| Surface Uniformity of Resin Molded Article | A | A | A | A | A |
| Evaluation of Odor | A | A | A | A | A |
| Bending Elastic Modulus (GPa) | 7 | 16.5 | 8 | 16.8 | 7.8 |
| Tensile Elastic Modulus (GPa) | 7.4 | 15.8 | 8.8 | 17.2 | 6.6 |
| Presence or Absence of Coating Layer | Presence | Presence | Presence | Presence | Presence |
| Average Fiber Length (mm) | 0.7 | 0.7 | 0.7 | 0.7 | 0.7 |
| Proportion of Aromatic Ring in Specific Resin (% by weight) | 0 | 0 | 0 | 0 | 31 |
| Number of Parts of Carbon Fiber (to 100 Parts of Thermoplastic Resin) | 10 | 200 | 10 | 200 | 10 |
| Number of Parts of Specific Resin (to 100 Parts of Thermoplastic Resin) | 20 | 100 | 20 | 100 | 20 |
| Number of Parts of Compatibilizer (to 100 Parts of Thermoplastic Resin) | 5 | 50 | 5 | 50 | 5 |
| % by weight of Specific Resin (to 100 Parts of Carbon Fiber) | 200 | 50 | 200 | 50 | 200 |
| % by weight of Compatibilizer (to 100 Parts of Carbon Fiber) | 50 | 25 | 50 | 25 | 50 |
| Number of Parts of Compatibilizer (to 100 Parts of Specific Resin) | 25 | 50 | 25 | 50 | 25 |
| Amount of Carbon Fiber occupied in Resin Molded Article (%) | 7.4 | 44.4 | 7.4 | 44.4 | 7.4 |

TABLE 2

|  |  |  | Example 12 | Example 13 | Example 14 | Comparative Example 1 | Comparative Example 2 | Comparative Example 3 |
|---|---|---|---|---|---|---|---|---|
| Composition | Thermoplastic Resin | Polypropylene (Melting Temperature 165° C.) | 100 | 100 | 100 | 100 | 100 | 100 |
|  |  | Polyethylene (Melting Temperature 120° C.) | | | | | | |
|  | Reinforcing Fiber | Carbon Fiber A (Surface-treated) | 50 | 50 | 50 | 35 | 35 | 5.5 |
|  |  | Carbon Fiber B (not Surface-treated) | | | | | | |
|  | Specific Resin | Aliphatic PA PA6 (Melting Temperature 225° C.) | | | | | | |
|  |  | PA11 (Melting Temperature 185° C.) | | | 12.5 | | | |
|  |  | PA12 (Melting Temperature 175° C.) | | 12.5 | | | | |
|  |  | PA66 (Melting Temperature 260° C.) | | | | 20 | | 10 |
|  |  | Aromatic PA MXD6 (Melting Temperature 237° C.) | 25 | 12.5 | 12.5 | | | |
|  |  | PA9T (306° C.) | | | | | 20 | 10 |
|  |  | Difference in Melting Temperature from Thermoplastic Resin (° C.) | 72 | 10 | 20 | 95 | 141 | 95 |
|  | Compatibilizer | Maleic Anhydride-modified Polypropylene | 25 | 25 | 25 | 0.1 | 0.1 | 15 |
|  |  | Maleic Anhydride-modified Polyethylene | | | | | | |
|  | Total | | 200 | 200 | 200 | 155.1 | 155.1 | 140.5 |
| Conditions | Molten-kneading Temperature (° C.) | | 240 | 240 | 240 | 290 | 310 | 310 |
|  | Injection Molding Temperature (° C.) | | 240 | 240 | 240 | 290 | 310 | 310 |
|  | Surface Uniformity of Resin Molded Article | | A | A | A | B | B | B |
|  | Evaluation of Odor | | A | A | A | B | C | C |
|  | Bending Elastic Modulus (GPa) | | 14.4 | 15.3 | 15.4 | 9.0 | 9.8 | 6.5 |
|  | Tensile Elastic Modulus (GPa) | | 13.6 | 14.9 | 15.6 | 7.2 | 8.2 | 1.5 |
|  | Presence or Absence of Coating Layer | | Presence | Presence | Presence | Presence | Presence | Presence |
|  | Average Fiber Length (mm) | | 0.7 | 0.7 | 0.7 | 0.7 | 0.7 | 0.7 |
|  | Proportion of Aromatic Ring in Specific Resin (% by weight) | | 31 | 31 | 31 | 0 | 26 | 13 |
|  | Number of Parts of Carbon Fiber (to 100 Parts of Thermoplastic Resin) | | 50 | 50 | 50 | 35 | 35 | 5.5 |
|  | Number of Parts of Specific Resin (to 100 Parts of Thermoplastic Resin) | | 25 | 25 | 25 | 20 | 20 | 20 |
|  | Number of Parts of Compatibilizer (to 100 Parts of Thermoplastic Resin) | | 25 | 25 | 25 | 0.1 | 0.1 | 15 |
|  | % by weight of Specific Resin (to 100 Parts of Carbon Fiber) | | 50 | 50 | 50 | 57 | 57 | 364 |
|  | % by weight of Compatibilizer (to 100 Parts of Carbon Fiber) | | 50 | 50 | 50 | 0.3 | 0 | 273 |
|  | Number of Parts of Compatibilizer (to 100 Parts of Specific Resin) | | 100 | 100 | 100 | 0.5 | 1 | 75 |
|  | Amount of Carbon Fiber occupied in Resin Molded Article (%) | | 25.0 | 25.0 | 25.0 | 22.6 | 22.6 | 3.9 |

|  |  |  | Comparative Example 4 | Comparative Example 5 | Comparative Example 6 | Comparative Example 7 |
|---|---|---|---|---|---|---|
| Composition | Thermoplastic Resin | Polypropylene (Melting Temperature 165° C.) | 100 | 100 | 100 | 100 |
|  |  | Polyethylene (Melting Temperature 120° C.) | | | | |
|  | Reinforcing Fiber | Carbon Fiber A (Surface-treated) | 30 | | | |
|  |  | Carbon Fiber B (not Surface-treated) | | | | |

TABLE 2-continued

|  |  |  |  |  |  |  |  |
|---|---|---|---|---|---|---|---|
|  | Specific Resin | Aliphatic PA | PA6 (Melting Temperature 225° C.) |  |  | 0.1 | 20 |
|  |  |  | PA11 (Melting Temperature 185° C.) |  |  |  |  |
|  |  |  | PA12 (Melting Temperature 175° C.) |  |  |  |  |
|  |  |  | PA66 (Melting Temperature 260° C.) |  |  |  |  |
|  |  | Aromatic PA | MXD6 (Melting Temperature 237° C.) |  |  |  |  |
|  |  |  | PA9T (306° C.) |  |  |  |  |
|  |  | Difference in Melting Temperature from Thermoplastic Resin (° C.) |  | — | — | 60 | 60 |
|  | Compatibilizer | Maleic Anhydride-modified Polypropylene |  |  |  | 0.1 | 20 |
|  |  | Maleic Anhydride-modified Polyethylene |  |  |  |  |  |
|  | Total |  |  | 130 | 100 | 100.2 | 140 |
|  | Molten-kneading Temperature (° C.) |  |  | 200 | 220 | 260 | 260 |
| Conditions | Injection Molding Temperature (° C.) |  |  | 200 | 220 | 260 | 260 |
|  | Surface Uniformity of Resin Molded Article |  |  | A | A | B | B |
|  | Evaluation of Odor |  |  | A | A | A | A |
|  | Bending Elastic Modulus (GPa) |  |  | 3 | 1.3 | 1.3 | 1.4 |
|  | Tensile Elastic Modulus (GPa) |  |  | 3.5 | 1.1 | 1.1 | 1.2 |
|  | Presence or Absence of Coating Layer |  |  | Absence | Absence | Absence | Absence |
|  | Average Fiber Length (mm) |  |  | 0.7 | 0.7 | 0.7 | 0.7 |
|  | Proportion of Aromatic Ring in Specific Resin (% by weight) |  |  |  |  | 0 | 0 |
|  | Number of Parts of Carbon Fiber (to 100 Parts of Thermoplastic Resin) |  |  | 30 | 0 | 0 | 0 |
|  | Number of Parts of Specific Resin (to 100 Parts of Thermoplastic Resin) |  |  | 0 | 0 | 0 | 20 |
|  | Number of Parts of Compatibilizer (to 100 Parts of Thermoplastic Resin) |  |  | 0 | 0 | 0 | 20 |
|  | % by weight of Specific Resin (to 100 Parts of Carbon Fiber) |  |  | 0 |  |  |  |
|  | % by weight of Compatibilizer (to 100 Parts of Carbon Fiber) |  |  | 0 |  |  |  |
|  | Number of Parts of Compatibilizer (to 100 Parts of Specific Resin) |  |  |  |  | 100 | 100 |
|  | Amount of Carbon Fiber occupied in Resin Molded Article (%) |  |  | 23.1 | 0.0 | 0.0 | 0.0 |

The details of materials shown in Tables 1 and 2 are as follows.

Thermoplastic Resin
   Polypropylene (NOVATEC (registered trade name) PPMA3, manufactured by Japan Polypropylene Corporation; melting temperature: 165° C.)
   Polyethylene (ULTZEX 20100J, manufactured by Prime Polymer Co., Ltd.; melting temperature: 120° C.)
Reinforcing Fiber
   Carbon fiber A (surface-treated, chopped carbon fiber TORAYCA (registered trade name), Toray Industries Inc., average fiber length: 20 mm, average diameter: 7 μm)
   Carbon fiber B (not surface-treated, obtained by dipping the above chopped carbon fiber TORAYCA (registered trade name), Toray Industries Inc., in a solvent to remove a sizing agent)
Specific Resin: Aliphatic PA (Aliphatic Polyamide)
   PA6 (NYLON6, ZYTEL (registered trade name) 7331J, manufactured by Dupont; melting temperature: 225° C.)
   PA11 (NYLON11, RILSAN, manufactured by Arkema; melting temperature: 185° C.)
   PA12 (NYLON12, RILSAMID, manufactured by Arkema; melting temperature: 175° C.)
   PA66 (NYLON66, 101L, manufactured by Dupont; melting temperature: 260° C.)
Specific Resin: Aromatic PA (Aromatic Polyamide)
   MXD6 (MXD6, manufactured by Mitsubishi Gas Chemical Company, melting temperature: 237° C.)
   PA9T (NYLON9T, GENESTAR PA 9T, manufactured by KURARAY CO., LTD.; melting temperature: 306° C.)
The description of "difference in melting temperature (° C.) from thermoplastic resin" represents the difference between the melting temperature of the thermoplastic resin and the melting temperature of the specific resin (polyamide).

Compatibilizer
   Maleic anhydride-modified polypropylene (YOUMEX (registered trade name) 110TS, manufactured by Sanyo Chemical Industries, Ltd.)
   Maleic anhydride-modified polyethylene (MODIC M142 manufactured by Mitsubishi Chemical Corporation)

It is found from the above results that, in Examples, it may be molded at a low temperature as compared to Comparative Examples. That is, it is found that, in Examples, a resin composition having superior low temperature moldability is obtained as compared to Comparative Examples.

When the molded articles prepared in each Example are analyzed by the method described above, it is confirmed that a layer of the compatibilizer used (layer of maleic anhydride modified polypropylene, layer of maleic anhydride modified polyethylene, and layer of maleic anhydride modified ethylene or vinyl acetate copolymer resin (EVA)) is interposed between the coating layer and the thermoplastic resin (layer of the compatibilizer is formed on the surface of the coating layer).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A resin composition, comprising:
   a thermoplastic resin;
   a carbon fiber;
   a resin containing at least one of an amide bond and an imide bond and having such a melting temperature that a difference in melting temperature between the resin containing at least one of an amide bond and an imide bond and the thermoplastic resin is 90° C. or lower; and a compatibilizer wherein an average fiber length of the carbon fiber is from 0.1 mm to 5.0 mm.

2. The resin composition according to claim 1, wherein a content of the carbon fiber is from 0.1 parts by weight to 200 parts by weight with respect to 100 parts by weight of the thermoplastic resin.

3. The resin composition according to claim 1, wherein a content of the resin containing at least one of an amide bond and an imide bond is from 0.1 parts by weight to 100 parts by weight with respect to 100 parts by weight of the thermoplastic resin.

4. The resin composition according to claim 1, wherein a content of the compatibilizer is from 1 part by weight to 50 parts by weight with respect to 100 parts by weight of the resin containing at least one of an amide bond and an imide bond.

5. The resin composition according to claim 1, wherein a content of the resin containing at least one of an amide bond and an imide bond is from 0.1% by weight to 200% by weight with respect to the weight of the carbon fiber.

6. A resin molded article, comprising:
a thermoplastic resin;
a carbon fiber;
a resin containing at least one of an amide bond and an imide bond and having such a melting temperature that a difference in melting temperature between the resin containing at least one of an amide bond and an imide bond and the thermoplastic resin is 90° C. or lower; and a compatibilizer wherein an average fiber length of the carbon fiber is from 0.1 mm to 5.0 mm.

7. The resin molded article according to claim 6, wherein a content of the carbon fiber is from 0.1 parts by weight to 200 parts by weight with respect to 100 parts by weight of the thermoplastic resin.

8. The resin molded article according to claim 6, wherein a content of the resin containing at least one of the amide bond and the imide bond is from 0.1 parts by weight to 100 parts by weight with respect to 100 parts by weight of the thermoplastic resin.

9. The resin molded article according to claim 6, wherein a content of the compatibilizer is from 1 part by weight to 50 parts by weight with respect to 100 parts by weight of the resin containing at least one of the amide bond and the imide bond.

10. The resin molded article according to claim 6, wherein a content of the resin containing at least one of the amide bond and the imide bond is from 0.1% by weight to 200% by weight with respect to the weight of the carbon fiber.

* * * * *